(12) United States Patent
Hara

(10) Patent No.: US 8,421,289 B2
(45) Date of Patent: Apr. 16, 2013

(54) SURFACE MOUNT MOTOR HAVING HOLDER WITH STOPPER PORTION FOR BRACKET

(75) Inventor: Kentaro Hara, Itabashi-ku (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 13/116,971

(22) Filed: May 26, 2011

(65) Prior Publication Data

US 2011/0291509 A1    Dec. 1, 2011

(30) Foreign Application Priority Data

May 31, 2010    (JP) ................................. 2010-124650

(51) Int. Cl.
*H02K 7/075*    (2006.01)
*H02K 5/00*    (2006.01)

(52) U.S. Cl.
USPC .............................................. 310/91; 310/81

(58) Field of Classification Search ............ 310/81, 310/91
See application file for complete search history.

(56) References Cited

U.S. PATENT DOCUMENTS

| | | | | |
|---|---|---|---|---|
| 5,986,367 A | * | 11/1999 | Tsuzaki et al. | 310/71 |
| 6,081,055 A | * | 6/2000 | Narusawa | 310/81 |
| 6,133,657 A | * | 10/2000 | Semenik et al. | 310/81 |
| 7,567,002 B2 | * | 7/2009 | Takagi et al. | 310/81 |
| 7,619,335 B2 | * | 11/2009 | Suzuki et al. | 310/81 |
| 7,679,240 B2 | * | 3/2010 | Kono | 310/81 |
| 7,825,555 B2 | * | 11/2010 | Uchiumi et al. | 310/81 |
| 7,888,832 B2 | * | 2/2011 | Masato | 310/81 |
| 2009/0039721 A1 | * | 2/2009 | Takagi et al. | 310/81 |
| 2009/0051238 A1 | * | 2/2009 | Umehara et al. | 310/91 |
| 2009/0184596 A1 | * | 7/2009 | Masato | 310/91 |
| 2011/0241464 A1 | * | 10/2011 | Kadowaki et al. | 310/81 |
| 2011/0291509 A1 | * | 12/2011 | Hara | 310/91 |
| 2011/0291510 A1 | * | 12/2011 | Hara | 310/91 |

FOREIGN PATENT DOCUMENTS

| | | | |
|---|---|---|---|
| EP | 840424 | * | 5/1998 |
| JP | 11-234943 | | 8/1999 |
| JP | 2008271769 | * | 11/2008 |

\* cited by examiner

*Primary Examiner* — Tran N. Nguyen
*Assistant Examiner* — David Scheuermann
(74) *Attorney, Agent, or Firm* — Beyer Law Group LLP

(57) ABSTRACT

A holder of a surface mount motor includes a holder body that is in contact with an outer peripheral surface of a motor casing and that is mounted on a circuit board, an extending portion that extends rearward from a rear end of the holder body in a direction of a rotational axis of a shaft, and a stopper that extends in a width direction of the extending portion at a rear end of the extending portion and that is press-fitted into a recess provided in a bracket fixed to the motor casing.

9 Claims, 12 Drawing Sheets

SURFACE MOUNT MOTOR HAVING HOLDER WITH STOPPER PORTION FOR BRACKET

CROSS REFERENCE TO RELATED APPLICATIONS

The present application claims the benefit of 35 U.S.C. §119 or 35 U.S.C. §365 under 37 C.F.R. §1.55 based on priority to Japanese Patent Application No. 2010-124650, filed May 31, 2010, which is hereby incorporated herein by reference in its entirety.

BACKGROUND OF THE INVENTION

1. Field of the Invention

The present invention relates to a motor suitable for surface mounting on a circuit board.

2. Description of the Related Art

Japanese Unexamined Patent Application Publication No. 11-234943 discloses an example of a technique in this field. A surface mount motor described in this publication includes a motor body and a metal holder frame fixed to the motor body. The motor body is a brush motor and has a substantially columnar drum portion (motor casing). The rear end of the substantially columnar drum portion is closed by an end bracket made of resin. Terminal pieces (terminals) that are mounted on a circuit board and brush terminal pieces that slide with respect to a commutator are fixed to the end bracket. The metal holder frame includes a holder body that is attached to the drum portion of the motor body. The holder body includes a rectangular bottom plate portion which contacts the circuit board and a pair of clamping spring pieces that are bent upward from the long sides of the bottom plate portion and that clamp the substantially columnar drum portion of the vibration motor body. Notches are formed in a rear part of the holder body at the left and right sides thereof, and a bottom narrow portion extends between the notches. A part of the bottom narrow portion at the rear end thereof stands upward and serves as a pressing piece. Other pressing pieces are provided on a front part of the holder body such that the pressing pieces are bent inward. The pressing pieces at the front of the holder frame and the pressing piece at the rear of the holder frame regulate the displacement of the holder frame with respect to the motor body in the direction of the rotational axis.

The pressing pieces provided at the rear end of the bottom narrow portion is simply bent so as to stand upward and pressed against the end bracket. Therefore, if the motor is dropped, the pressing piece is easily deformed outward. As a result, the end bracket is easily detached from the drum portion of the motor body. If the end bracket is detached, the terminals are easily detached from the circuit board together with the end bracket, which makes it impossible to supply power to the motor.

SUMMARY OF THE INVENTION

An object of the present invention is to provide a surface mount motor including a terminal which is not easily detached from a circuit board.

According to an aspect of the present invention, a surface mount motor includes a motor body including a tubular motor casing; a bracket fixed to a rear end of the motor casing; a terminal attached to the bracket, the terminal being mounted on a circuit board; and a holder attached to the motor casing of the motor body. The holder includes a holder body that is in contact with an outer peripheral surface of the motor casing, the holder body being mounted on the circuit board, an extending portion that extends rearward in an axial direction of the motor body from a rear end of the holder body, and a stopper that extends in a width direction of the extending portion at a rear end of the extending portion, the stopper being press-fitted into a recess provided in the bracket.

In the surface mount motor, the holder body attached to the motor casing and the terminal fixed to the bracket are mounted on the circuit board. The terminal is mounted on the circuit board with solder, and has a small mounting surface. Therefore, when, for example, an impact is applied to the bracket and the bracket is detached from the motor casing, the terminal is easily detached from the circuit board. In such a case, it becomes impossible to supply electricity to the motor. In particular, in the case where a weight is provided on a shaft of the motor, if the motor is dropped, there is a high possibility that the shaft will be suddenly shifted in the axial direction (thrust direction). When the rear end of the shaft strongly hits the bracket as a result of the movement of the shaft, the terminal easily becomes detached from the motor casing. To reduce such a risk, according to an embodiment of the present invention, the stopper is press-fitted into the recess formed in the bracket, the stopper extending in the width direction at the rear end of the extending portion that extends rearward from the rear end of the holder body in the axial direction. Accordingly, the bracket can be reliably prevented from being pulled out in the axial direction, and is not easily detached from the motor casing. As a result, the terminals are not easily separated from the circuit.

Preferably, the extending portion is not in contact with the circuit board.

The extending portion is connected to the holder body that is mounted on the circuit board. Therefore, the cream solder applied between the circuit board and the holder easily flows along the extending portion. Since the extending portion is not in contact with the circuit board, excess solder can be easily collected in the space between the extending portion and the circuit board when the cream solder is melted in the electric furnace.

Preferably, the extending portion includes a front part that is inclined with respect to a mounting surface of the holder body and a rear part that extends along the motor casing and is in contact with the motor casing.

In this structure, the extending portion is not in contact with the circuit board. Thus, the rear part of the extending portion can be stably placed on the motor casing. Accordingly, the stopper of the extending portion can be easily press-fitted into the recesses in the bracket.

According to the present invention, the terminal is not easily detached from the circuit board.

DESCRIPTION OF THE PREFERRED EMBODIMENTS

Figure 1:
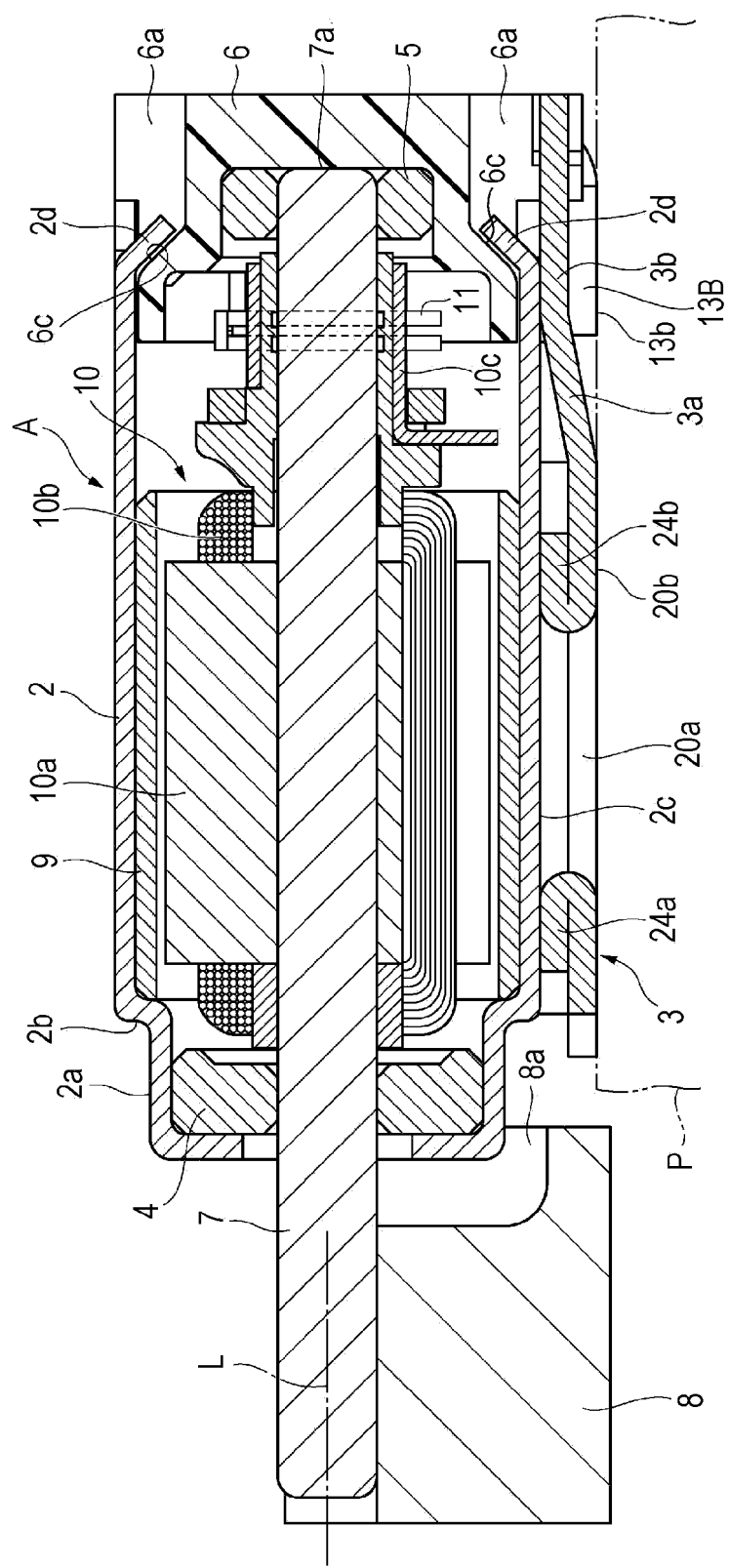
FIG. 1 is a sectional view of a surface mount motor according to an embodiment of the present invention.
Figure 2:
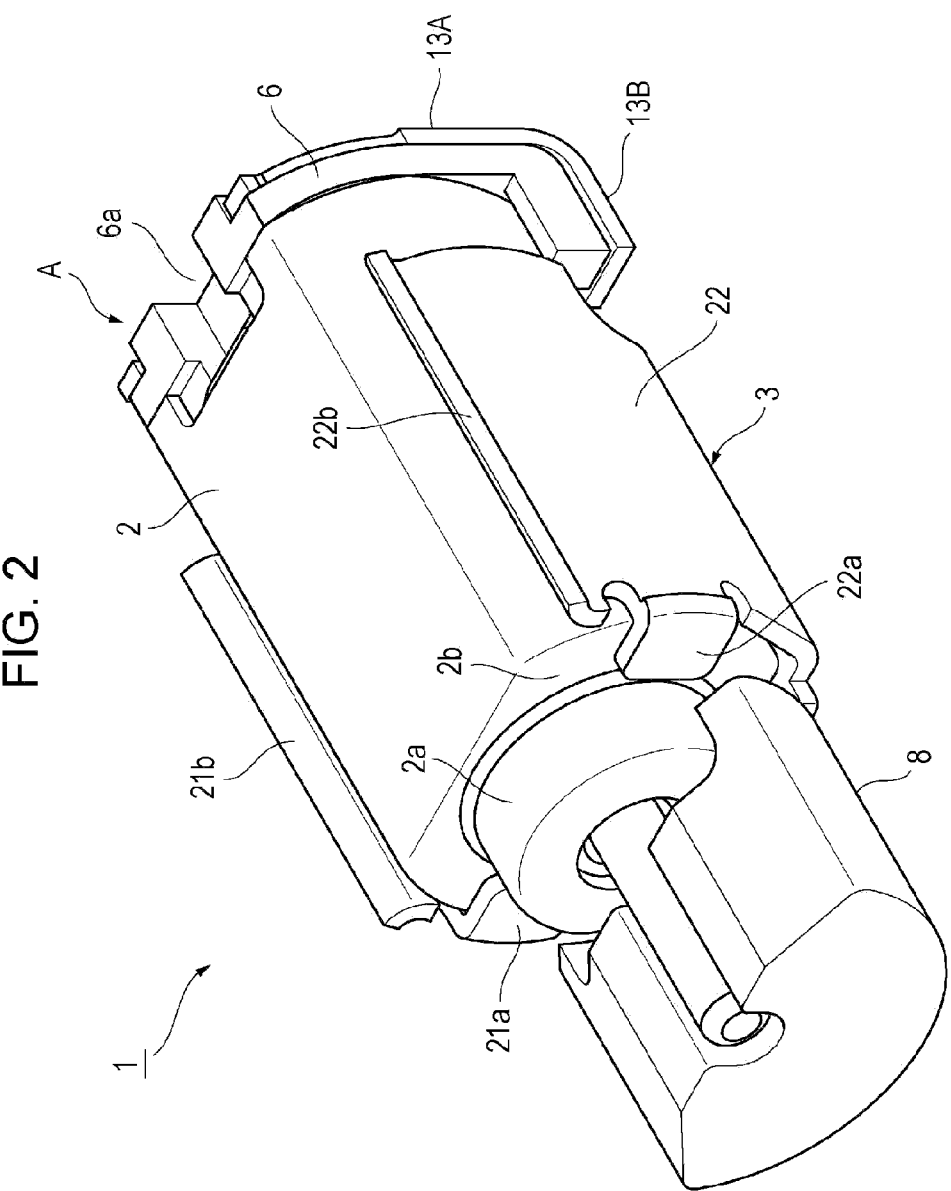
FIG. 2 is a perspective view of the motor illustrated in FIG. 1.
Figure 3:
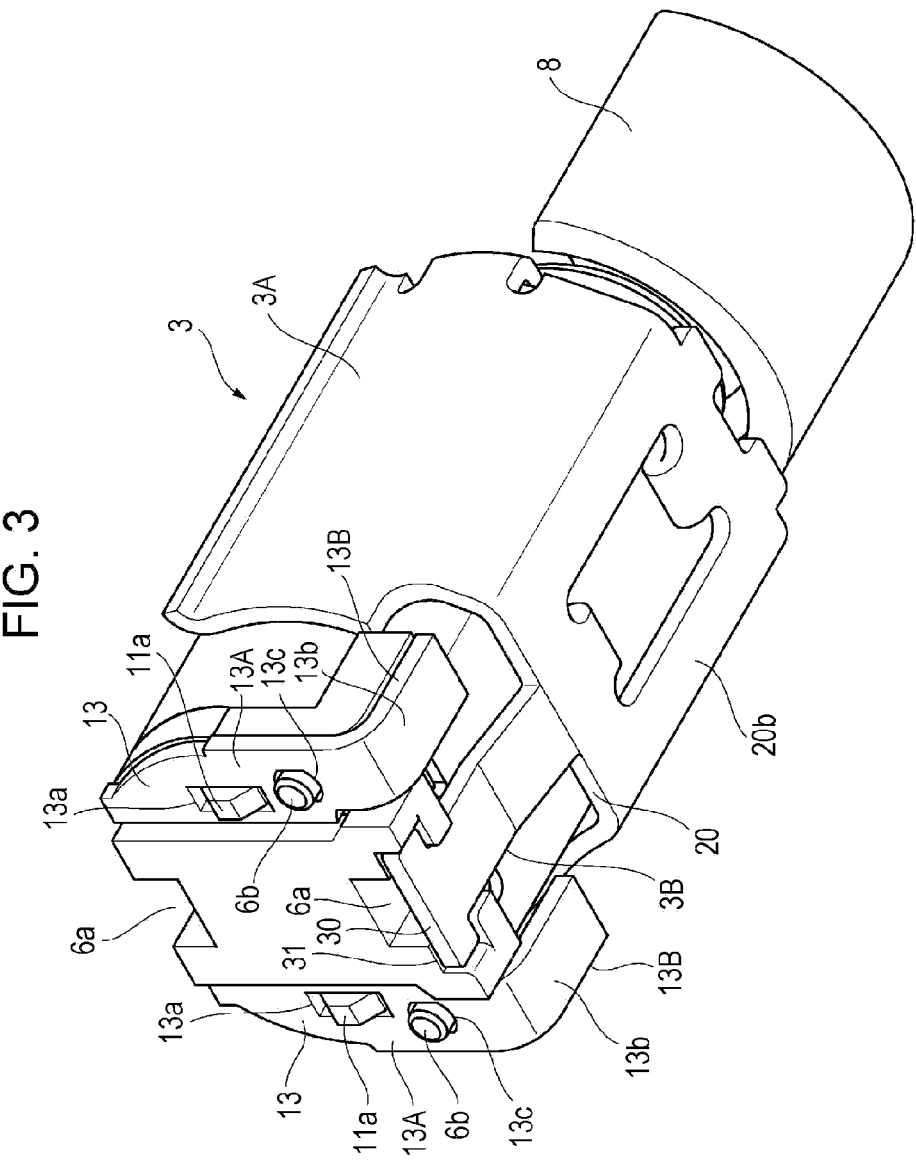
FIG. 3 is another perspective view of the motor illustrated in FIG. 1.
Figure 4:
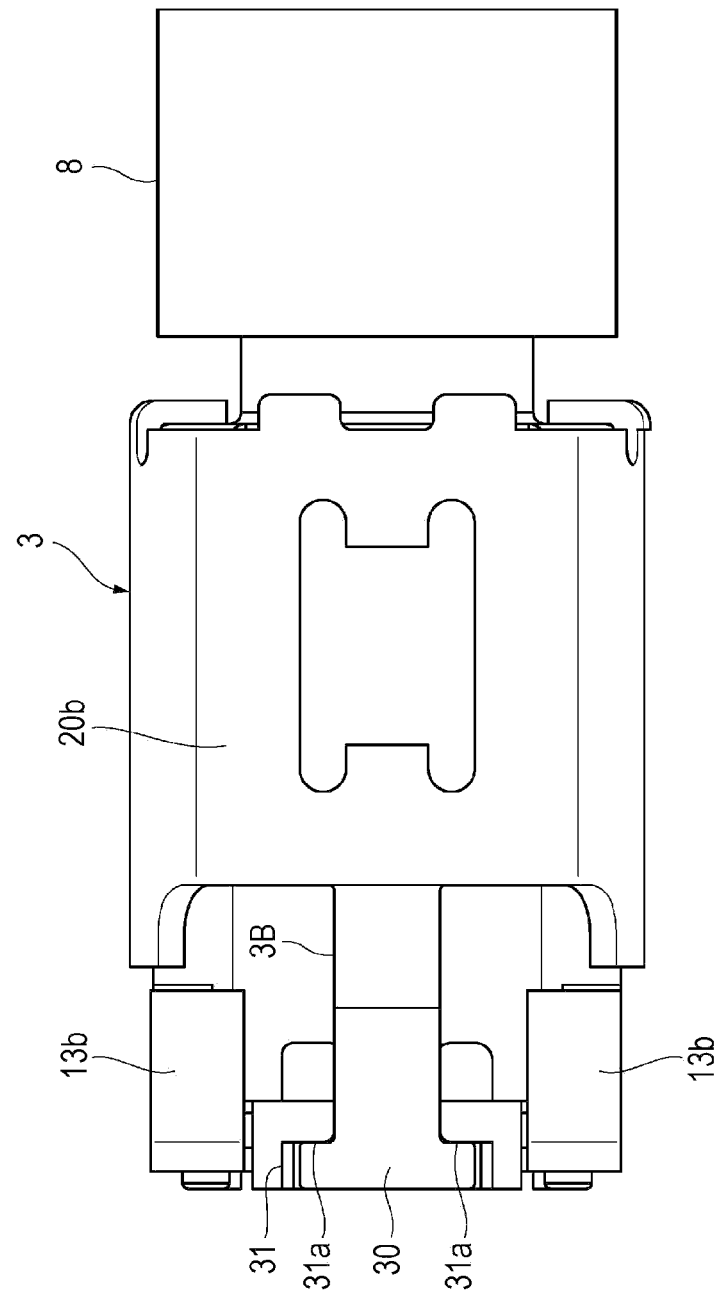
FIG. 4 is a bottom view of the motor illustrated in FIG. 1.

A surface mount motor according to an embodiment of the present invention will be described with reference to the drawings. In the following description, the side at which a weight is provided is defined as the "front side".

Referring to FIGS. 1 to 4, a surface mount motor 1 is a small vibration motor that is surface-mounted on a printed wiring board (circuit board) P by reflow soldering. The motor 1 includes a motor body A and a metal holder 3. The motor body A includes a motor casing 2 that has a tubular shape with a diameter of about 4 mm and a length of about 10 mm The metal holder 3 is attached to the motor casing 2 of the motor body A such that the motor body A can be mounted on the printed wiring board P.

The motor casing 2 is made of a metal, and has a cylindrical shape or an oval shape in cross section. The motor casing 2 is open at the rear end thereof, and a bracket 6 made of resin is attached to the rear end of the motor casing 2. The motor casing 2 is provided with a neck portion 2a that projects from the front end of the motor casing 2 and that has a smaller diameter than that of the motor casing 2. A part of a shaft 7 projects from the front end of the neck portion 2a. A weight 8 having a semicircular shape in cross section is eccentrically fixed to an end portion of the shaft 7 by crimping or press-fitting. A recess 8a for receiving a part of the neck portion 2a is formed in the rear end surface of the weight 8.

The shaft 7 to which the weight 8 is fixed is supported by bearings 4 and 5. The bearing 4 is impregnated with oil and press-fitted into the neck portion 2a, and the bearing 5 is impregnated with oil and press-fitted into the bracket 6. When the shaft 7 rotates, a rear end 7a of the shaft 7 slides along an inner wall surface of the bracket 6. A pair of lugs 2d that project rearward are provided at the rear end of the motor casing 2 so as to face each other in the radial direction. Each lugs 2d is bent inward in the shape of a letter 'V' in a recess 6a formed in the bracket 6, and is pressed against an inclined front end surface 6c of the recess 6a in the bracket 6. Thus, the bracket 6 is fixed to the motor casing 2, and is prevented from being detached from the motor casing 2.

The motor casing 2 of the motor body A houses a stator 9 that is composed of a permanent magnet and bonded to an inner wall surface of the motor casing 2, and a rotor 10 that is surrounded by the stator 9 and fixed to the shaft 7. The rotor 10 includes a core 10a and a coil 10b wound around the core 10a, and the coil 10b is connected to a commutator piece 10c fixed to the shaft 7 at the rear end side of the motor casing 2. The commutator piece 10c rotates while sliding along a pair of brushes 11 that are fixed to the bracket 6.

The bracket 6 has through holes through which connection terminal pieces 11a provided on the brushes 11 project. A pair of terminals 13 that are bent in an L-shape are fixed to the bracket 6 at the left and right sides thereof. Each of the L-shaped terminals 13 includes a base portion 13A that is in contact with the rear end surface of the bracket 6 and a mounting portion 13B that is bent at a right angle with respect to the base portion 13A and is surface-mounted on the printed wiring board P with cream solder.

The connection terminal pieces 11a of the brushes 11 that project from the rear end surface of the bracket 6 project from first holes 13a formed in the base portions 13A of the terminals 13. The connection terminal pieces 11a of the brushes 11 that project from the base portions 13A of the terminals 13 are electrically connected to the base portions 13A with solder. Positioning pins 6b are provided on the rear end surface of the bracket 6 so as to project from second holes 13c formed in the base portions 13A of the terminals 13. Thus, the terminals 13 are positioned with respect to the bracket 6.

Figure 5:
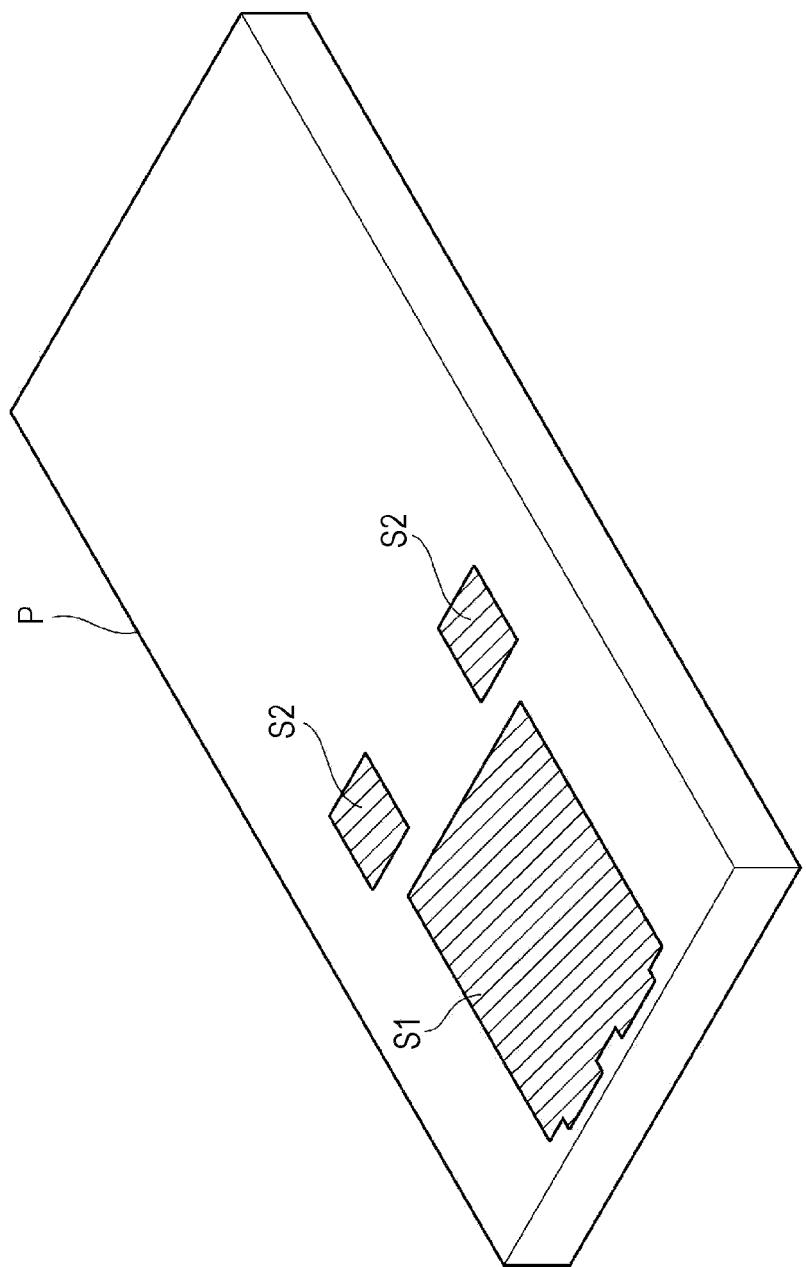
FIG. 5 is a perspective view of a printed wiring board.

Referring to FIG. 5, the printed wiring board (circuit board) P has a holder fixing pattern S1 and power supply patterns S2. A mounting surface 20b (see FIG. 3) of a bottom portion 20 of a holder body 3A of the holder 3 is mounted on the holder fixing pattern S1. The power supply patterns S2 are located behind the holder fixing pattern S1, and mounting surfaces 13b (see FIG. 3) of the mounting portions 13B of the terminals 13 at the left and right sides are placed on the power supply patterns S2.

Figure 6:
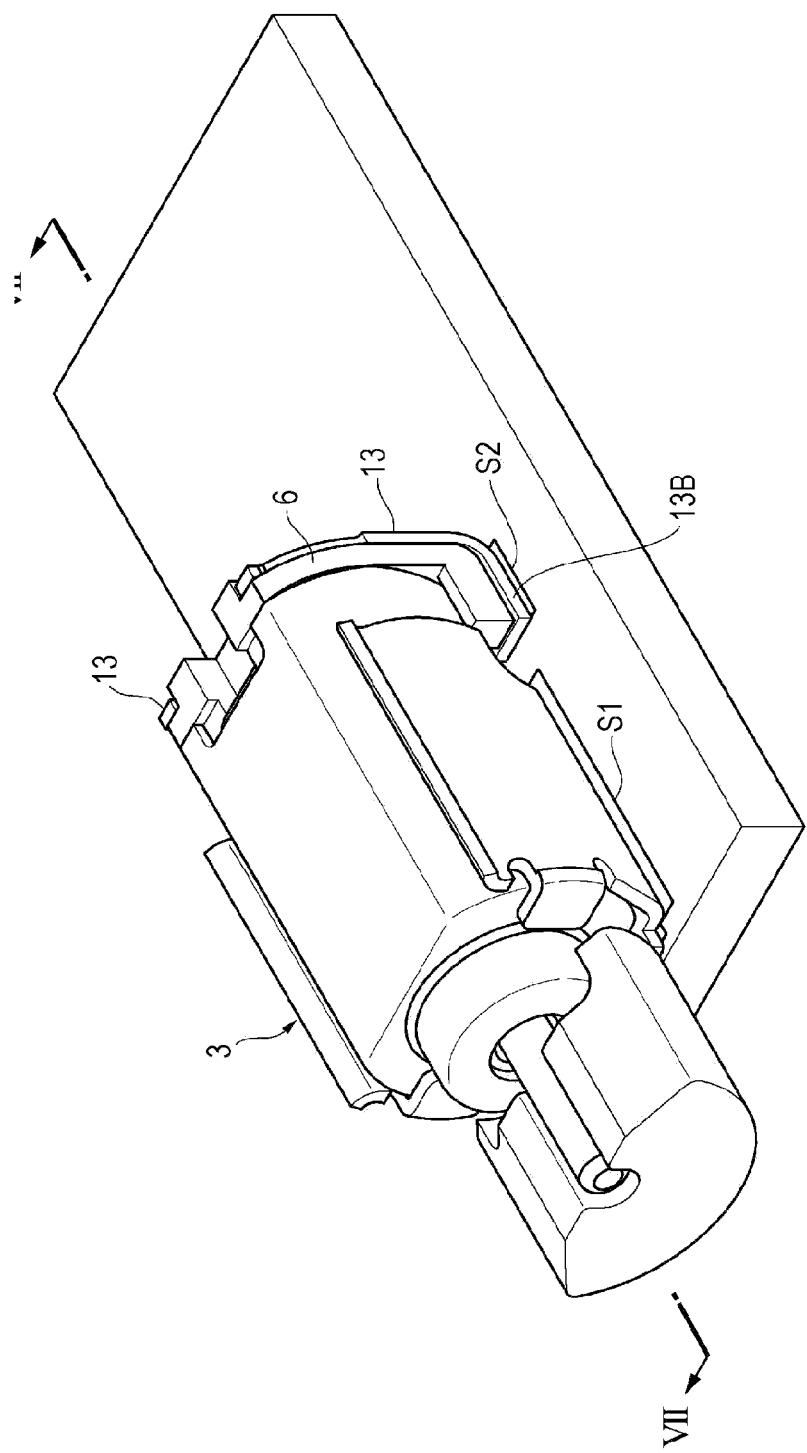
FIG. 6 is a perspective view illustrating the state in which the motor is mounted on the printed wiring board.
Figure 7:
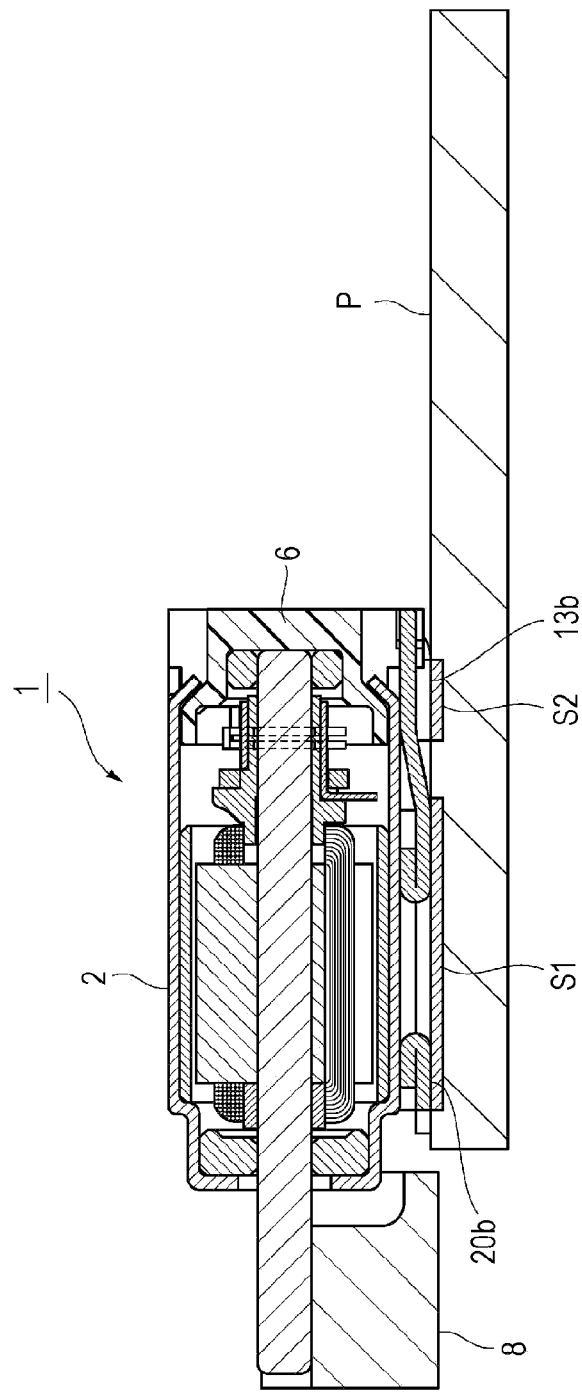
FIG. 7 is a sectional view of FIG. 6 taken along line VII-VII.
Figure 8:
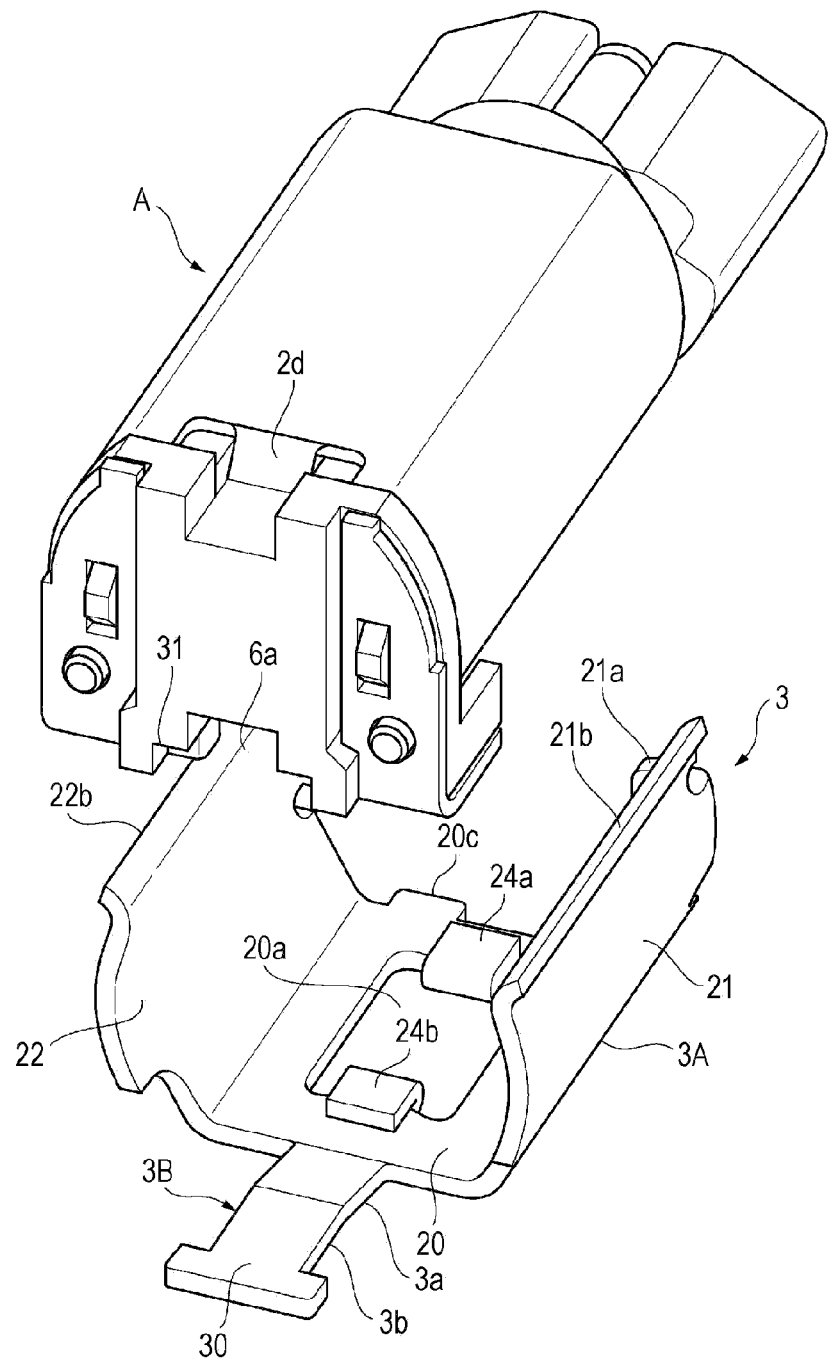
FIG. 8 is a perspective view illustrating the state before a motor body is assembled to a holder.
Figure 9:
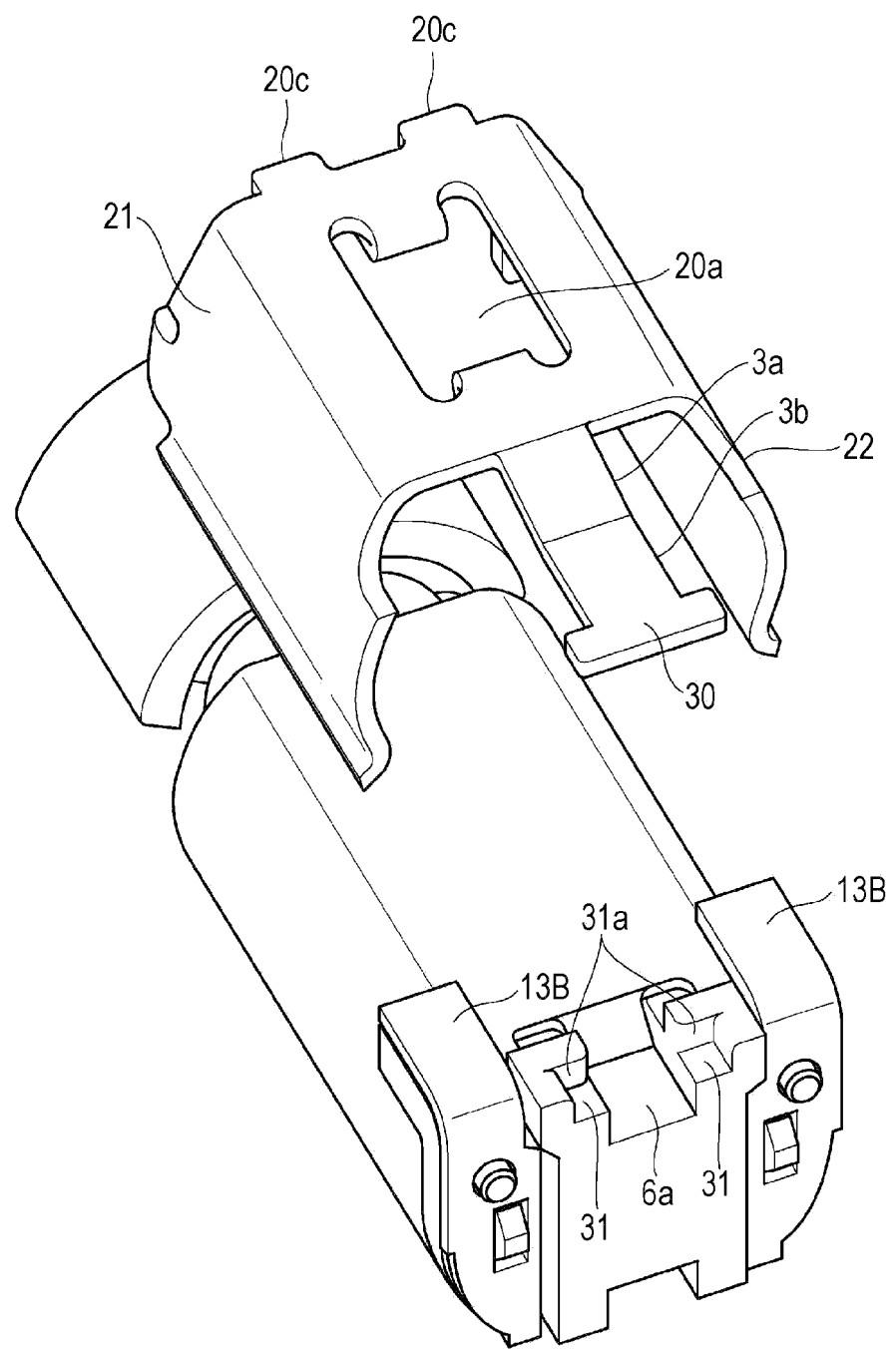
FIG. 9 is another perspective view illustrating the state before the motor body is assembled to the holder.
Figure 10:
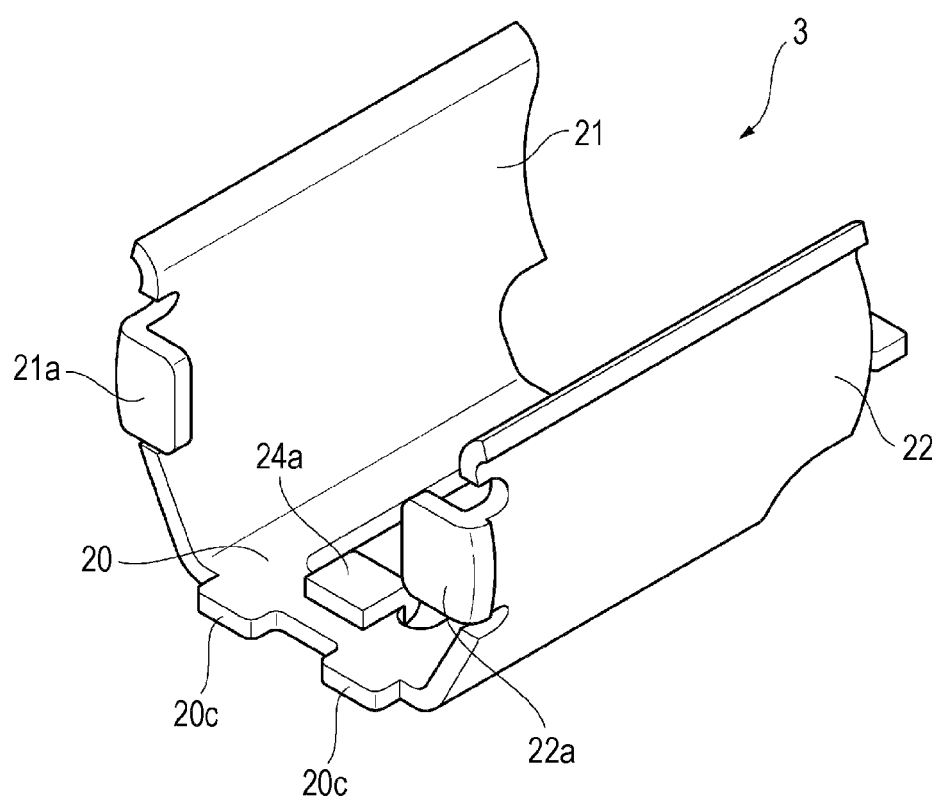
FIG. 10 is a perspective view of the holder.
Figure 11:
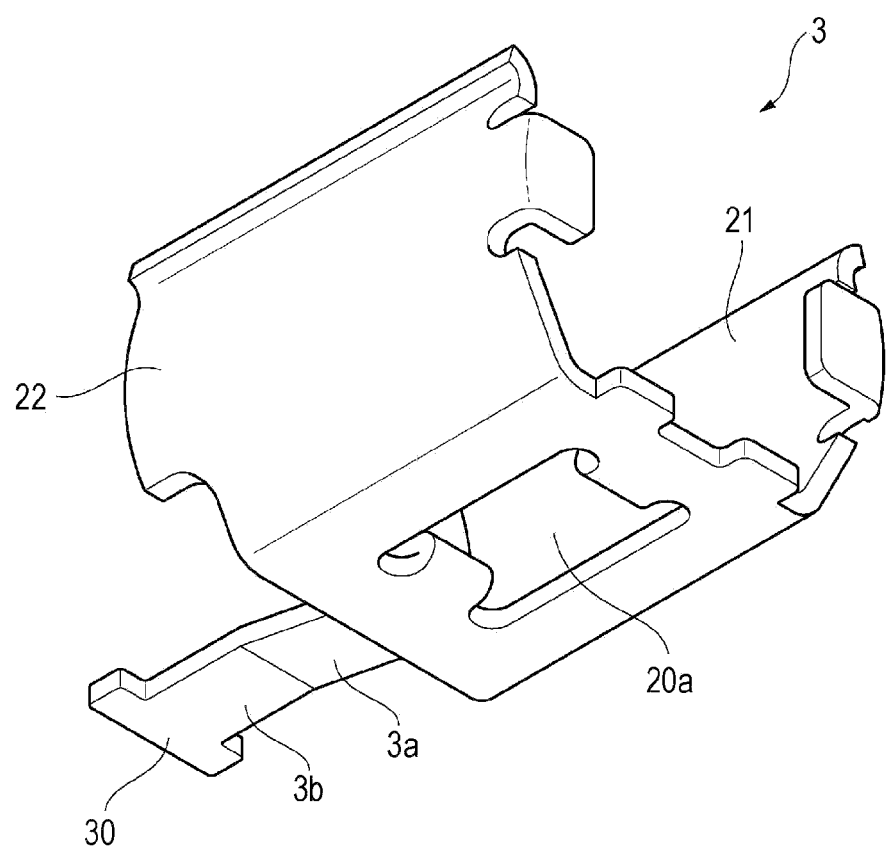
FIG. 11 is another perspective view of the holder.
Figure 12:
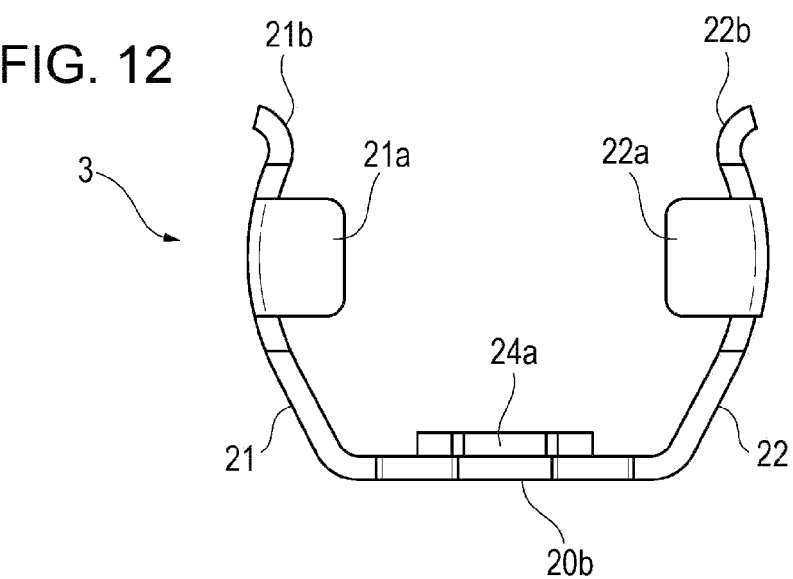
FIG. 12 is a front view of the holder.
Figure 13:
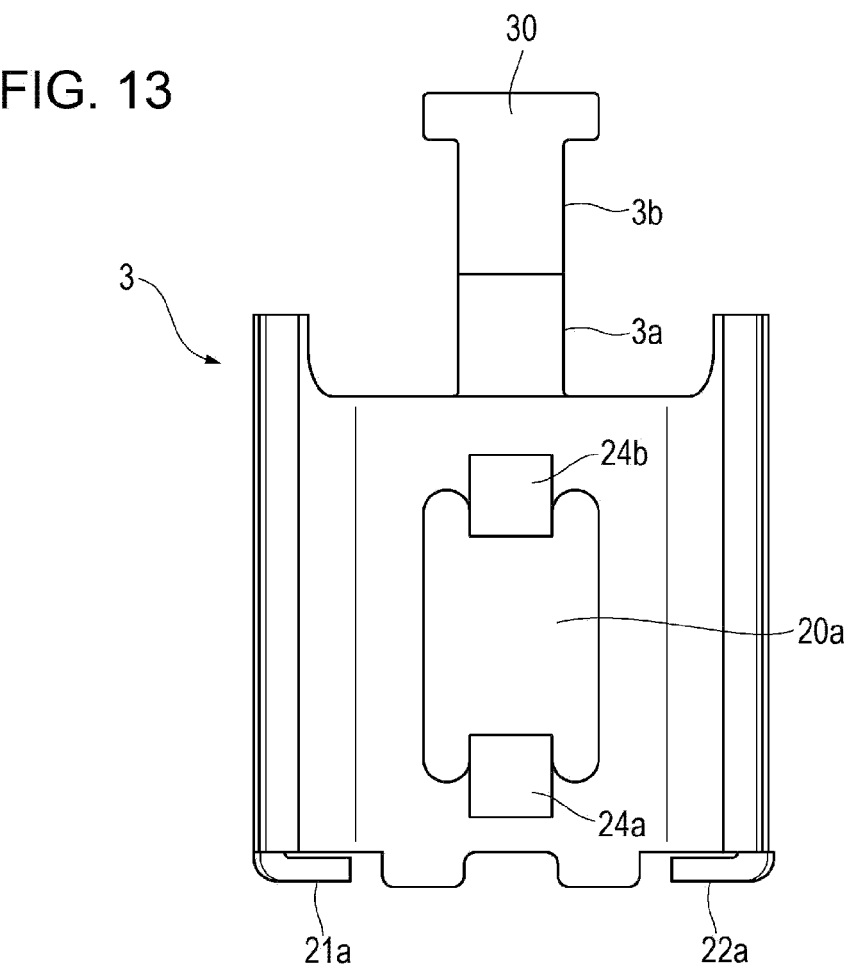
FIG. 13 is a plan view of the holder.

Referring to FIGS. 6 and 7, cream solder is applied to the holder fixing pattern S1 and the power supply patterns S2, and then a mounting device places the mounting surface 20b of the holder 3 on the holder fixing pattern S1 and the mounting surfaces 13b of the mounting portions 13B of the terminals 13 on the power supply patterns S2. Thus, the motor 1 is mounted on the printed wiring board P. In this state, the motor 1 and the printed wiring board P are placed in an electric furnace and the cream solder is melted. As a result, the mounting surface 20b of the holder 3 is integrated with the holder fixing pattern S1 by the solder, and the mounting portions 13B of the terminals 13 are integrated with the power supply patterns S2 by the solder.

The metal holder 3 to which the above-described motor body A is attached will now be described in detail.

Referring to FIGS. 8 to 13, the metal holder 3 has a thickness of 0.2 mm, and is formed by punching out a flat plate having a predetermined shape from a single stainless-steel plate and bending the flat plate.

The holder 3 includes a holder body 3A and an extending portion 3B that extends rearward from the rear end of the holder body 3A substantially in a direction of a rotational axis L. The holder body 3A includes the bottom portion 20 having a rectangular shape that is surface-mounted on the printed wiring board P with the cream solder and clamp pieces 21 and 22 having spring characteristics that extend upward from both sides of the bottom portion 20 in a curved shape. The bottom portion 20 has extension portions 20c that project from the front end of the bottom portion 20 in the direction of the rotational axis L.

The clamp pieces 21 and 22 are provided with lugs 21a and 22a, respectively, which are bent inward at the front ends of the clamp pieces 21 and 22. The lugs 21a and 22a extend toward the neck portion 2a of the motor casing 2 in a direction perpendicular to the rotational axis L. The lugs 21a and 22a are in contact with a step surface 2b (see FIG. 2) of the motor casing 2. Guide portions 21b and 22b that are bent outward are formed at the free ends of the clamp pieces 21 and 22, respectively, which are curved along the outer peripheral surface of the motor casing 2. The guide portions 21b and 22b are provided so that the clamp pieces 21 and 22 can be easily pushed away from each other when the motor casing 2 is pushed into the holder body 3A. Moreover, an adhesive can easily flow into gaps between the motor casing 2 and the clamp pieces 21 and 22 in the process of fixing the motor casing 2 to the holder 3 with the adhesive.

The bottom portion 20 of the holder 3 has a substantially rectangular opening 20a formed therein, and is provided with bottom-raising pieces 24a and 24b. The bottom-raising pieces 24a and 24b are initially formed so as to project into the opening 20a in the direction of the rotational axis L, and are outwardly folded. The bottom-raising pieces 24a and 24b are opposed to each other in the direction of the rotational axis L.

Referring to FIG. 1, the metal holder 3 that is in contact with a bottom surface 2c of the motor casing 2 has a thickness of 0.2 mm. Accordingly, owing to the bottom-raising pieces 24a and 24b, the bottom surface 2c of the motor casing 2 can be separated from the mounting surface 20b of the bottom portion 20 by 0.4 mm. The mounting portions 13B of the terminals 13 are formed so as to project in the radial direction from the bottom end of the bracket 6. The mounting surface 20b of the holder 3 is located in the same plane as the mounting surfaces 13b of the mounting portions 13B of the terminals 13 that are fixed to the bracket 6.

As illustrated in FIGS. 8 to 13, the holder 3 is provided with the extending portion 3B that extends rearward from the rear end of the holder body 3A substantially in the direction of the rotational axis L. The extending portion 3B extends from the rear end of the holder body 3A toward the bracket 6, and has a certain width. The extending portion 3B is provided with a stopper portion 30 that extends in the width direction (direction orthogonal to the rotational axis L) at the rear end of the extending portion 3B. The stopper portion 30 extends in the shape of a letter 'T' in the direction orthogonal to the rotational axis L.

The resin bracket 6 has recesses 31 between the mounting portions 13B of the terminals 13. The stopper portion 30 is press-fitted into the recesses 31. The recesses 31 are formed so as to extend outward in the width direction (direction orthogonal to the rotational axis L) at the rear end side of one of the recesses 6a, and front wall surfaces 31a of the recesses 31 are in pressure contact with the stopper portion 30 (see FIG. 4). Thus, the holder 3 reliably prevents the bracket 6 from being pulled out in the direction of the rotational axis L. After the stopper portion 30 of the extending portion 3B is press-fitted into the recesses 31, the adhesive is injected into the gaps between the motor casing 2 and the clamp pieces 21 and 22. Thus, the motor casing 2 is fixed to the holder 3 with the adhesive. Accordingly, the bracket 6 is securely retained in the direction of the rotational axis L by the extending portion 3B.

The extending portion 3B is not in contact with the printed wiring board P. A front part 3a of the extending portion 3B is inclined with respect to the mounting surface 20b of the holder body 3A such that the front part 3a approaches the motor casing 2 as the distance from the holder body 3A increases. A rear part 3b of the extending portion 3B extends along the motor casing 2 and is in contact with the motor casing 2 (see FIG. 1). Since the front part 3a of the extending portion 3B is inclined, the rear part 3b of the extending portion 3B is easily set to a state in which the rear part 3b is raised by a distance of 0.2 mm, which is equivalent to the thickness of the holder 3, from the printed wiring board P.

In the above-described structure, the extending portion 3B is not in contact with the printed wiring board P. Thus, the rear part 3b of the extending portion 3B can be stably placed on the motor casing 2. Accordingly, the stopper portion 30 of the extending portion 3B can be easily press-fitted into the recesses 31 in the bracket 6.

The extending portion 3B is connected to the holder body 3A that is mounted on the printed wiring board P. Therefore, the cream solder applied between the printed wiring board P and the holder 3 easily flows along the extending portion 3B. Since the extending portion 3B is not in contact with the printed wiring board P, excess solder can be easily collected in the space between the extending portion 3B and the printed wiring board P when the cream solder is melted in the electric furnace.

The terminals 13 are mounted on the printed wiring board P with solder. The terminals 13 have small mounting surfaces. Therefore, when, for example, an impact is applied to the bracket 6 and the bracket 6 is detached from the motor casing 2, the terminals 13 are easily detached from the printed wiring board P. In such a case, it becomes impossible to supply electricity to the motor 1. In particular, in the case where the weight 8 is attached to the shaft 7 of the motor 1, if the motor 1 is dropped, there is a high possibility that the shaft 7 will be suddenly shifted in the direction of the rotational axis (thrust direction). When the rear end 7a of the shaft 7 strongly hits the bracket 6 as a result of the movement of the shaft 7, the terminals 13 easily become detached from the motor casing 2.

To reduce such a risk, the stopper portion 30 is press-fitted into the recesses 31 formed in the bracket 6, the stopper portion 30 extending in the width direction at the rear end of the extending portion 3B that extends rearward from the rear end of the holder body 3A substantially in the direction of the rotational axis L. Accordingly, even when the bracket 6 is fixed to the motor casing 2 using only the lugs 2d without performing welding or applying an adhesive, the bracket 6 can be reliably prevented from being pulled out in the direction of the rotational axis L. Thus, the bracket 6 is not easily detached from the motor casing 2. As a result, the terminals 13 are not easily separated from the printed wiring board P. The extending portion 3B may be formed to be flat over the entire area thereof.

What is claimed is:

1. A surface mount motor, comprising:
   a motor body including a tubular motor casing;
   a bracket fixed to a rear end of the motor casing;
   a terminal attached to the bracket, the terminal being configured to be mounted on a circuit board; and
   a holder attached to the motor casing of the motor body, wherein the holder includes:
      a holder body being in contact with an outer peripheral surface of the motor casing, the holder body being configured to be mounted on the circuit board;
      an extending portion extending rearward in an axial direction of the motor body from a rear end of the holder body; and
      a stopper portion integrally provided at a rear end of the extending portion, the stopper portion extending in a width direction of the extending portion so as to have a width greater than that of the extending portion, the stopper being press-fitted into a recess provided in the bracket.

2. The surface mount motor according to claim 1, wherein the extending portion is being configured not to be in contact with the circuit board.

3. The surface mount motor according to claim 1, wherein the extending portion includes:
   a front part that is inclined with respect to a mounting surface of the holder body; and
   a rear part that extends along the motor casing and is in contact with the motor casing.

4. The surface mount motor according to claim 2, wherein the extending portion includes:
   a front part that is inclined with respect to a mounting surface of the holder body; and a rear part that extends along the motor casing and is in contact with the motor casing.

5. The surface mount motor according to claim 1, wherein the stopper portion has an engaging wall facing frontward, and the recess of the bracket has a receiving wall facing rearward, such that the engaging wall and the receiving wall abut each other.

6. The surface mount motor according to claim 1, wherein the stopper portion has an engaging wall configured to abut a wall of the recess facing rearward so as to prevent the bracket from being detached from the motor casing when the bracket is pulled rearward.

7. A surface mount motor, comprising:
a motor body including a tubular motor casing;
a terminal attached to a bracket, the terminal being configured to be mounted on a circuit board; and
a holder attached to the motor casing of the motor body, the holder including:
a holder body being in contact with an outer peripheral surface of the motor casing, the holder body being configured to be mounted on the circuit board;
an extending portion extending rearward in an axial direction of the motor body from a rear end of the holder body; and
a stopper portion integrally provided at a rear end of the extending portion, the stopper portion extending in a width direction of the extending portion so as to have an engaging wall facing frontward,
wherein the bracket is attached to a rear end of the motor casing, the bracket having a recess for receiving the stopper portion, the recess including a receiving wall facing rearward, the receiving wall and the engaging wall abutting each other.

8. The surface mount motor according to claim 7, wherein the engaging wall of the stopper portion is configured to abut the receiving wall of the recess so as to prevent the bracket from being detached from the motor casing when the bracket is pulled rearward.

9. The surface mount motor according to claim 7, wherein the stopper portion has a width greater than that of the extending portion to form the engaging wall.

\* \* \* \* \*